(12) United States Patent
Rahim et al.

(10) Patent No.: US 8,089,861 B1
(45) Date of Patent: *Jan. 3, 2012

(54) DATA VERIFICATION USING SIGNATURE

(75) Inventors: Rami Rahim, Sunnyvale, CA (US);
Pradeep Sindhu, Los Altos Hills, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 118 days.

This patent is subject to a terminal disclaimer.

(21) Appl. No.: 12/143,064

(22) Filed: Jun. 20, 2008

Related U.S. Application Data

(63) Continuation of application No. 10/210,511, filed on Jul. 31, 2002, now Pat. No. 7,406,089.

(51) Int. Cl.
*H04L 9/30* (2006.01)
(52) U.S. Cl. ......... 370/216; 370/412; 370/352; 713/161
(58) Field of Classification Search .................. 370/216, 370/352, 412; 713/161
See application file for complete search history.

(56) References Cited

U.S. PATENT DOCUMENTS

| | | | | |
|---|---|---|---|---|
| 5,633,931 | A * | 5/1997 | Wright | 713/161 |
| 6,105,072 | A * | 8/2000 | Fischer | 719/315 |
| 6,694,451 | B2 * | 2/2004 | Atkinson | 714/15 |
| 6,708,289 | B1 * | 3/2004 | Kudo | 714/28 |
| 6,717,917 | B1 | 4/2004 | Weissberger | 370/252 |
| 6,768,943 | B2 | 7/2004 | Pearson | 701/301 |
| 6,988,199 | B2 * | 1/2006 | Toh et al. | 713/170 |
| 6,988,235 | B2 | 1/2006 | Brown | 714/758 |
| 7,110,351 | B2 | 9/2006 | Steer et al. | 370/208 |
| 7,200,105 | B1 * | 4/2007 | Milliken et al. | 370/216 |
| 7,216,233 | B1 | 5/2007 | Krueger | 713/176 |
| 7,325,165 | B2 | 1/2008 | Paaske | 714/38 |
| 2002/0161723 | A1 * | 10/2002 | Asokan et al. | 705/67 |
| 2008/0098232 | A1 * | 4/2008 | Miyazaki et al. | 713/176 |

OTHER PUBLICATIONS

Co-pending U.S. Appl. No. 10/210,511, filed Jul. 31, 2002, entitled "Cell Write Signature," Rami Rahim et al.

\* cited by examiner

*Primary Examiner* — Daniel J Ryman
*Assistant Examiner* — Jay P Patel
(74) *Attorney, Agent, or Firm* — Harrity & Harrity, LLP

(57) ABSTRACT

A system processes packets in a network device and includes a memory for buffering the packets. The memory may store the packets in memory in data cells. To expedite packet processing, portions of the packet are extracted and placed in a notification, which is then used for packet processing operations, such as route lookup, policing, and accounting. The notification may also include address elements, such as address offsets, that define the locations of the data cells in memory. The address elements can be used to read the data cells from the memory when packet processing is done. If the notification cannot hold all the address elements, additional cells, indirect cells, are created for holding the remaining address elements. The indirect cells are formed in a linked list. The notification contains an address element. To prevent reading incorrect indirect cells, each indirect cell is written with a signature that is created based on the notification. When an indirect cell is read out, the signature is checked to determine whether it belongs to that notification. If the signature is not correct, this may mean that the indirect cell has not yet been written to memory, or that the indirect cell was in some way corrupted during writing, storing, or reading.

19 Claims, 6 Drawing Sheets

DATA VERIFICATION USING SIGNATURE

CROSS-REFERENCE TO RELATED APPLICATIONS

This application is a continuation of prior U.S. patent application Ser. No. 10,210,511, filed Jul. 31, 2002 U.S. Pat. No. 7,406,089, titled "CELL WRITE SIGNATURE," the disclosure of which is hereby incorporated by reference herein.

BACKGROUND OF THE INVENTION

1. Field of the Invention

The present invention relates generally to storing and retrieving information, and in particular to systems and methods for verifying information when the information is read out of memory.

2. Description of Related Art

Conventional network devices, such as routers, relay packets from a source to a destination through a network. Typically, each network device includes a memory subsystem that temporarily buffers packets while certain parts of the packet are processed. For example, the packet may be buffered while a route lookup is performed on the packet header, or while packet accounting is performed. After packet processing is done, the packet is read out of the memory subsystem and forwarded by the network device.

Packets are buffered in a variety of ways. For example, a network device may use a linked list to buffer packets or portions of packets in the memory subsystem. Each member of the linked list may include packet-related data, such as a portion of the packet or other information related to the packet. Each member also includes an address to the location of the next member in the list. Reading a packet out of the memory subsystem involves first reading the head member of the linked list using an address to the head member. Since each member includes an address to the next member, the remaining members of the list can be read out sequentially. The packet-related data is extracted from the members of the linked list, processed, and forwarded.

Packets may be buffered in other ways as well. For example, packet segments may be stored in sequential memory locations or randomly in memory. A list of addresses may be used to track the locations.

Storing the packet and processing it in parallel provides enhanced performance. Performing storage and processing in parallel can, however, lead to problems. For example, problems may occur if processing finishes before the entire packet is stored. If storing the packet takes longer than the processing, the system may attempt to read the packet out of the memory subsystem before the packet is completely is stored. Attempting to read out the packet before it is finished being written will result in reading out incorrect data, data that is not part of the packet. It is also possible that even though the packet is stored prior to the packet processing being finished, the packet data was corrupted in some way during writing, storage, or reading.

Therefore, there exists a need for systems and methods that ensure that stored information can be verified upon read out.

SUMMARY OF THE INVENTION

Systems and methods consistent with the present invention address this and other needs by storing data in memory with a signature. The signature identifies the data as belonging to a particular group. When the data is read out of memory, the signature is checked to determine whether the data is valid.

In one embodiment, a signature is created from an algorithm performed on a first data entity. In one embodiment, the first data entity may be data that will be processed separate from second data, such as a cell, that will be stored. An example of the first data entity is a notification, a data structure that carries information from or about a packet. The signature is stored with second data. When the second data and its signature are read out, the signature is compared to the original signature to determine whether the second data is valid.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of embodiments consistent with the principles of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the principles of the invention create a signature based on a first data entity, and store the signature with second data as it is written into memory. The signature identifies the second data as belonging to a particular group of data. In one embodiment, the first data entity is a notification, a data structure that includes information from a packet, about a packet, or both. The signature may be created based on some or all of the first data entity. Upon reading out the second data, the signature is checked to determine whether the second data is valid.

Figure 1:
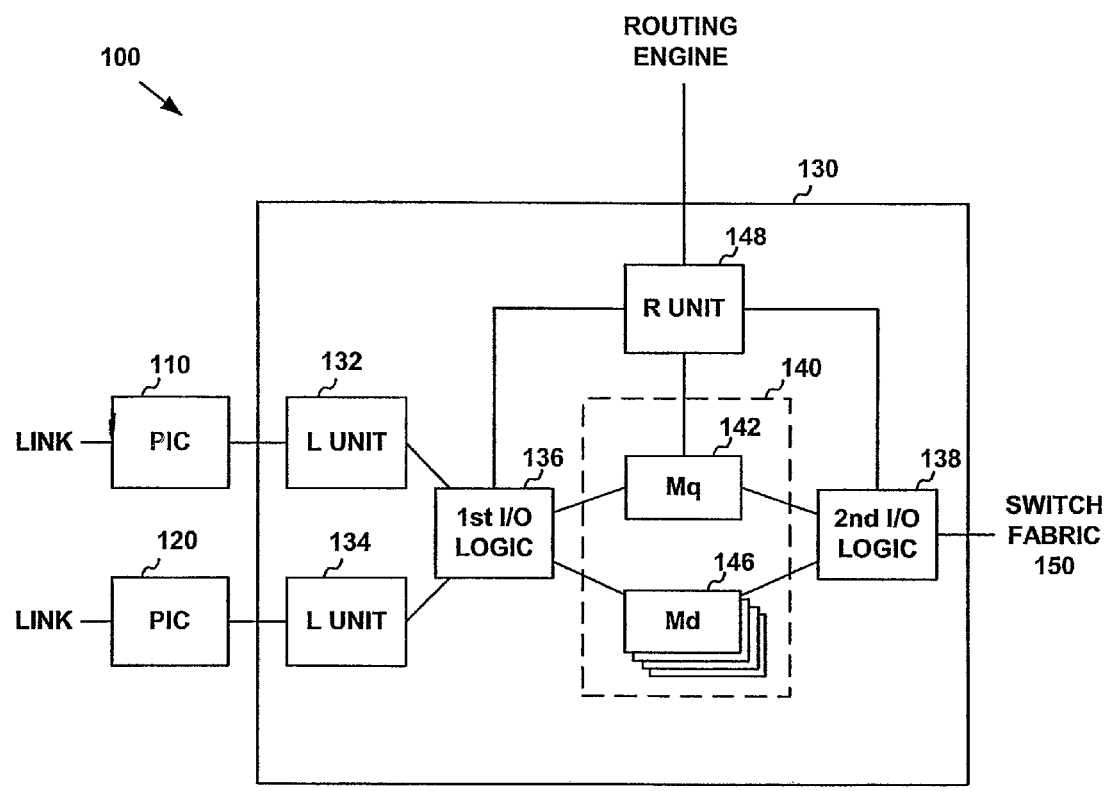
FIG. 1 is an exemplary diagram of a packet forwarding engine (PFE) according to an implementation consistent with the principles of the invention.

FIG. 1 is an exemplary diagram of an implementation of a packet forwarding engine (PFE) 100 consistent with the principles of the invention. PFE 100 may act as a standalone device for routing traffic on physical interface cards (PICs) 110 and 120. PFE 100 may also be connected via switch fabric 150 to other PFEs (not shown). PFE 100 may receive traffic from PICs 110 or 120, determine destination information for the traffic, and route the traffic back out on PICs 110 or 120, or to another PFE via switch fabric 150.

PICs 110 and 120 are connected to a flexible port concentrator (FPC) 130. Although two PICs 110 and 120 are shown in FIG. 1, there may be a single PIC or additional PICs in other implementations consistent with the principles of the invention. PICs 110 and 120 connect to one or more physical or wireless communications links and FPC 130, and operate to transport data between the links and FPC 130. Each of PICs 110 and 120 may handle one or more types of communication, such as Ethernet or ATM, over a physical or wireless link.

In one embodiment consistent with the principles of the invention, PFE 100 routes packets. Packets typically need to be encapsulated with layers of protocol information for transport over a network. For incoming packets, PICs 110 and 120 may strip off the layer 1 (L1) protocol information and forward the remaining data, for example raw packets, to FPC 130. For outgoing packets, PICs 110 and 120 may receive packets from FPC 130, encapsulate the packets in L1 protocol information, and transmit the data on the link.

FPC 130 performs packet transfers between PIC 110, PIC 120, and the switch fabric 150. For each packet, FPC 130 may process parts of the packet and at the same time be in the process of buffering the packet. For example, FPC 130 may perform a route lookup based on packet header information while buffering the packet. The route lookup provides destination information for the packet. FPC 130 then reads the packet out of the buffer and sends the packet either to PIC 110, PIC 120, or switch fabric 150, depending on the destination information.

FPC 130 may include L units 132 and 134, a first input/output (I/O) logic 136, a second input/output (I/O) logic 138, a memory subsystem 140, and an R unit 148. Memory subsystem 140 includes a notification queue memory (Mq) 142 and a data cell memory (Md) 146. Each of the L units 132 and 134 may operate to process packets received from PIC 110 or 120, respectively, and packets received from first I/O logic 136. For example, L unit 132 may convert packets from PIC 110 into data cells (D cells), and transmit the D cells to first I/O logic 136. D cells are a data structure that may be used internally by FPC 130 for transporting and storing packets.

Packets received by L unit 132 include two portions: a header portion and a packet data portion. L unit 132 may process the header and the remainder of each packet, and insert information resulting from the processing into one or more D cells. The information inserted into the D cells may include, for example, some or all of the header, parts of the remainder of the packet, packet processing results, or a combination of these. In one embodiment, the information is inserted in the first two D cells of the D cells carrying the packet. The D cells may also carry the remainder of the packet.

For outgoing packets, L unit 132 receives D cells from the first I/O logic 136, extracts information from the D cells, and creates a packet based on the extracted information. L unit 132 creates the packet header from information in the D cells, such as the header information, header-related information, or control information, or a combination of these. L unit 132 may also load the packet with packet data from the D cells.

First I/O logic 136 coordinates data transfers into and out of FPC 130 on the PIC side of FPC 130. First I/O logic 136 receives D cells from L units 132 and 134, and sends the D cells to memory subsystem 140. In response, memory subsystem 140 stores the D cells in Md 146 and sends back to first I/O logic 136 address information that defines where each D cell is stored. In one embodiment, first I/O logic 136 uses the address information to create address elements, such as address offsets, that may be used later to read out the D cells for the packet.

First I/O logic 136 creates a notification for each packet. The notification is a data structure that includes basic information regarding the packet and address elements that may be used for reading out of the D cells for the packet. Notification 270 can only store a limited number of address elements. If the notification does not have capacity to hold all the address elements for a packet, additional D cell address elements may be stored in one or more indirect cells (I cells) in Md 146. In one embodiment, if there is more than on I cell, the I cells are stored as a linked list. The notification includes a link to the first I cell in the chain.

A notification is complete either when all the D cells are stored and all the address elements for accessing the D cells are stored in the notification, or when the notification is full of address elements and the link to the first I cell has been stored in the notification. After the notification is complete, first I/O logic 136 forwards the notification to R unit 148 for processing.

Second I/O logic 138 performs similar notification creation and D cell storing operations based on packets in D cells it receives over switch fabric 150. Second I/O logic 138 creates a notification for each packet, and sends the notification to R unit 148. Second I/O logic 138 also stores D cells in Md 146, creating I cells to store additional address elements if necessary.

R unit 148 communicates with first I/O logic 136, second I/O logic 138, and memory subsystem 140. R unit 148 receives notifications from first I/O logic 136 and second I/O logic 138, and may perform various types of packet-related processing; such as route lookup, accounting, and policing, based on the notification. R unit 148 may receive one or more forwarding tables from a routing engine (not shown) and use the forwarding tables to perform routing related processing, or other packet-related processing, such as route lookups, policing, and accounting. R unit 148 may insert the results of the processing into a notification, and send the modified notification to Mq 142 in memory subsystem 140.

Mq 142 stores the modified notifications from the R unit 148. Mq 142 queues the notifications and forward them to first I/O logic 136 and second I/O logic 138, depending on the destination of the packet associated with the notification.

When first I/O logic 136 or second I/O logic 138 receives a notification from Mq 142, it reads D cells from Md 146 using the address elements stored in the notification and I cells linked to the notification, if any. Using first 110 logic 136 as an example, first I/O logic 136 reads D cells out of Md 146 using the D cell address elements stored in the notification and cells, if any, and forwards the D cells to L unit 132 or 134.

Sending the notification to R unit 148 for processing while storing the remaining D cells for a packet may create problems. For example, if R unit 148 finishes notification processing before all the D cells are stored in Md 146, it is possible that an attempt will be made to read out the D cells from Md 146, even though they aren't yet stored. Attempting to read out the packet before it is finished being written will result in reading out incorrect data, data that is not part of the packet. It is also possible that the I cells were in some way corrupted when they were written to Md 146 or while they were stored. It is also possible that the I cells might be corrupted when they are read out.

To overcome these and other issues, first I/O logic 136 and second I/O logic 138 create a signature based on the notification, and store the signature with each I cell. Storing a signature with each I cell allows each I cell to be validated when it is read out of Md 146.

The signature may be based on a portion of the notification. For example, in one embodiment, the signature is based on a portion of the notification that will not be changed by R unit 148. The signature may be the result of performing a mathematical algorithm on the address elements stored in the notification. For example, a cyclic redundancy check could be performed over the address elements. The signature essentially identifies each I cell as being associated with the notification.

Using first I/O logic 136 by way of example, suppose first I/O logic 136 has received a notification from Mq 142. First I/O logic 136 generates a signature from the notification using the same process as was used to create the signature that was stored with the I cells. As each I cell is read from Md 146, the signature stored with the I cells is compared with the generated signature. If they match, the I cell is considered valid. If they do not match, this may mean that the I cell has not yet been written, or that the I cell was in some way corrupted.

In another embodiment, the signature is stored with the notification. Thus, when it is time to read out the D cells associated with a notification, the signature does not need to be generated—it may simply be read from the notification.

Figure 2:
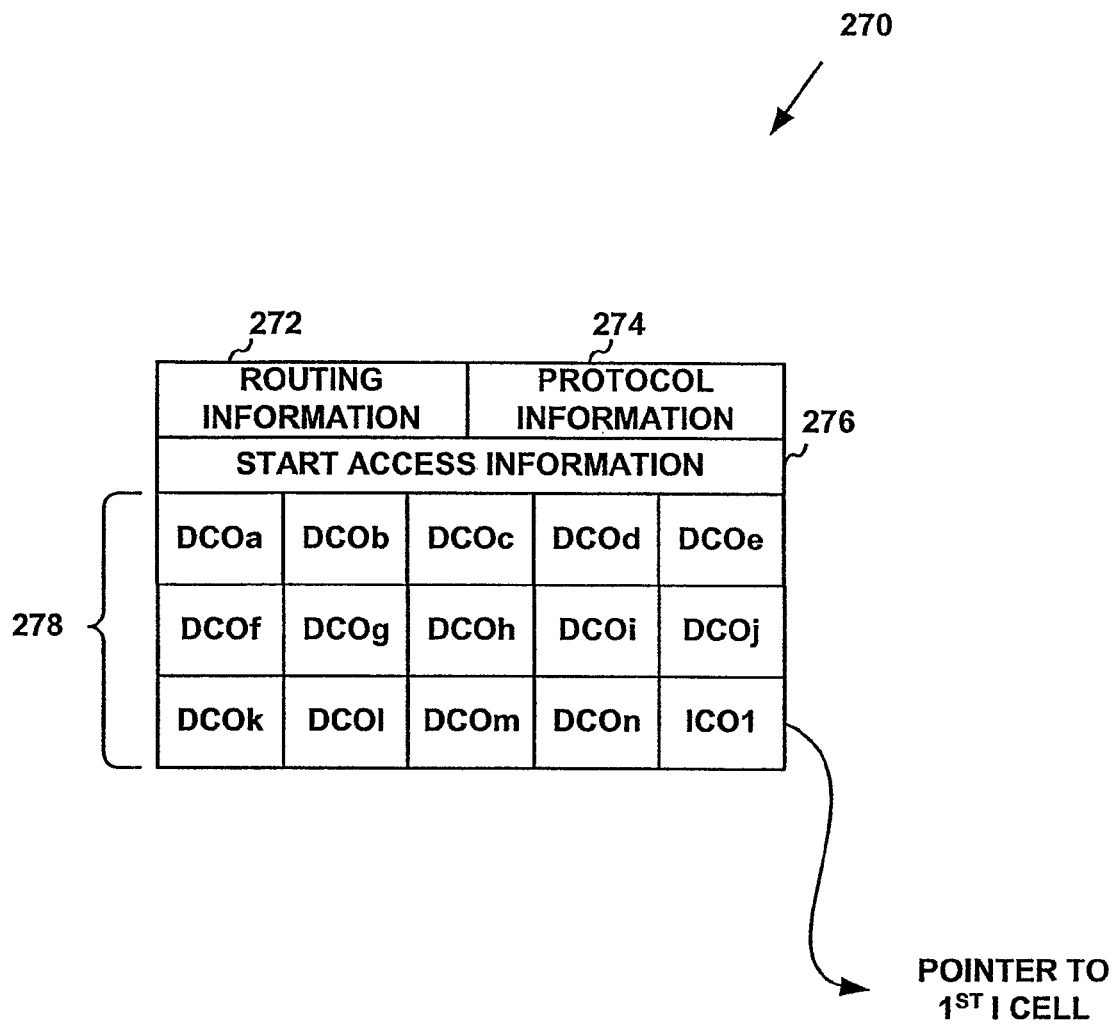
FIG. 2 is a block diagram illustrating an embodiment of a data structure for carrying information regarding a packet.

FIG. 2 illustrates an embodiment of a notification. A notification 270 may include administrative information regarding a packet and address elements used for reading D cells from Md 146. The administrative information is illustrated in FIG. 2 as routing information 272 and protocol information 274. These fields may include a variety of packet-related information, such as a route lookup key based on the packet header, other types of information about the packet, particular characteristics of the packet, portions of the packet, results from processing the packet, or a combination of these.

The address elements included in notification 270 are used to read D cells from Md 146. In FIG. 2, the address elements are illustrated by start access information 276 and data cell address offsets (DC0a-DC0n) 278. Start access information 276 may be the address in Md 146 of the first D cell in the series of D cells that store a packet and information associated with the packet. In an alternative embodiment, start access information 276 may be address information that is used to create an address to the first D cell in the series of D cells.

Address offsets 278 may be used for retrieving subsequent D cells in the series of D cells. The first address offset, DC0a, is an offset from start access information 276. The second address offset, DC0b is an offset from the address formed by adding DC0a to the start address, etc. If an I cell is linked to the notification, the last location of address offsets 278 will hold an I cell offset, illustrated in FIG. 2 as ICO1. If there are fifteen or fewer address offsets needed, there is no need for an I cell because notification 270 can store all the address offsets necessary for retrieving the D cells. In the illustrated embodiment, if there are exactly fifteen D cell address offsets, the location illustrated as storing ICO1 in FIG. 2 will store a D cell offset (DCO1) instead.

Figure 3:
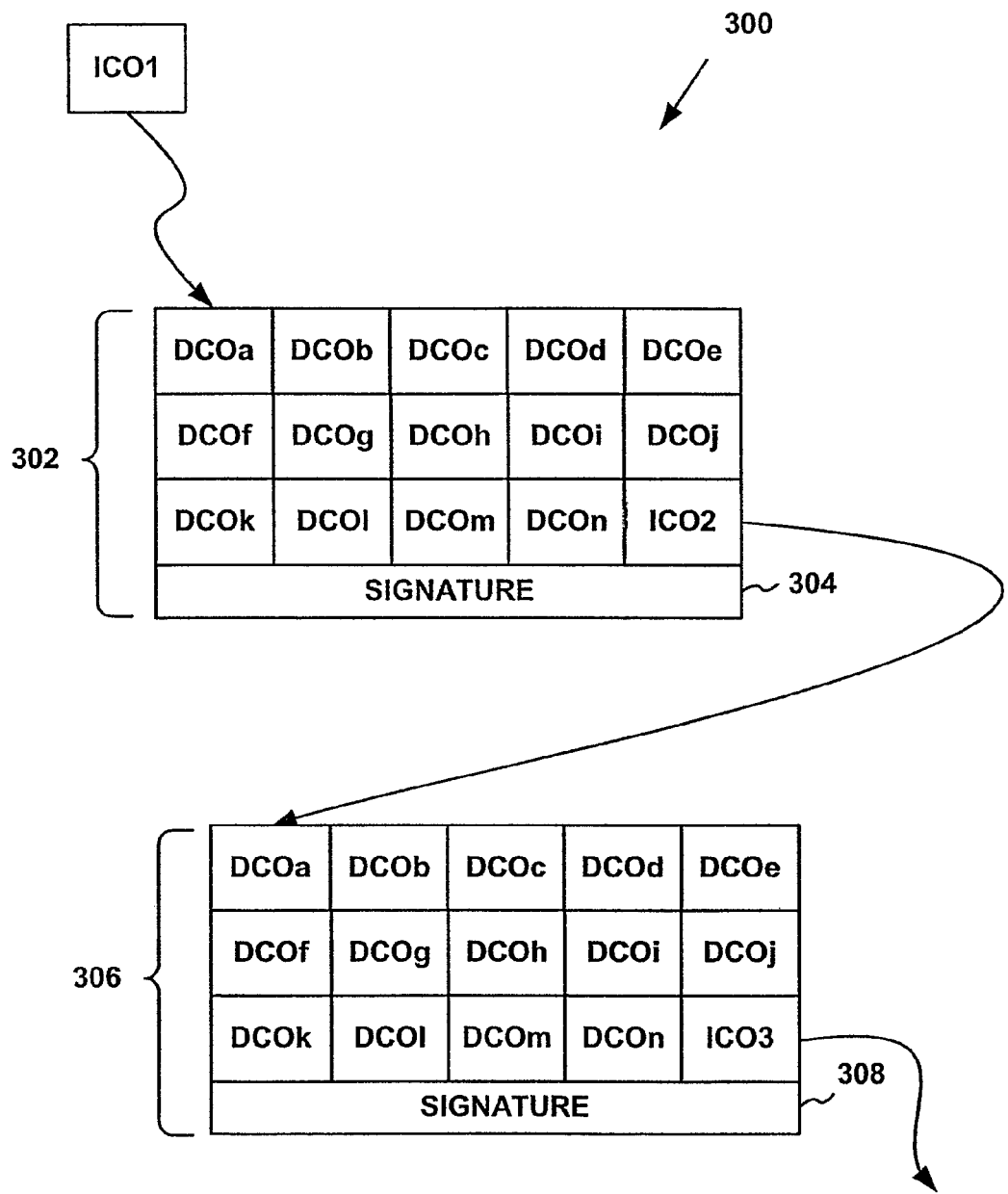
FIG. 3 is a block diagram illustrating an organization of indirect cells in an implementation consistent with the principles of the invention.

FIG. 3 illustrates a linked list of I cells, consistent with the principles of the invention. The linked list of I cells 300 is formed by I cell 302 and I cell 306 and are stored in Md 146. The list is formed by ICO1 pointing to I cell 302, ICO2 of I cell 302 pointing to I cell 306, and ICO3 of I cell 306 pointing to the next I cell in the linked list. ICO1 is the I cell address information from notification 270 of FIG. 2. In one embodiment, ICO1 is an address offset from the address created using D cell address offset DCOn of FIG. 2.

As with the notification of FIG. 2, in the illustrated embodiment, an I cell can store up to fifteen D cell offsets. If there are exactly fifteen offsets, the last location will store a D cell offset rather than an I cell offset.

Each I cell in linked list 300 includes a signature. I cell 302 includes signature 304 and I cell 306 includes signature 308. The signature is based on the notification and identifies each I cell as being associated with a particular notification. The signature may be created by either first I/O logic 136 or second I/O logic 138.

The signature allows each I cell to be validated when it is read out of Md 146. This prevents attempting to read an I cell that has not yet been written to Md 146, or reading an I cell that was corrupted in some way in the writing, storing, and reading processes.

Figure 4:
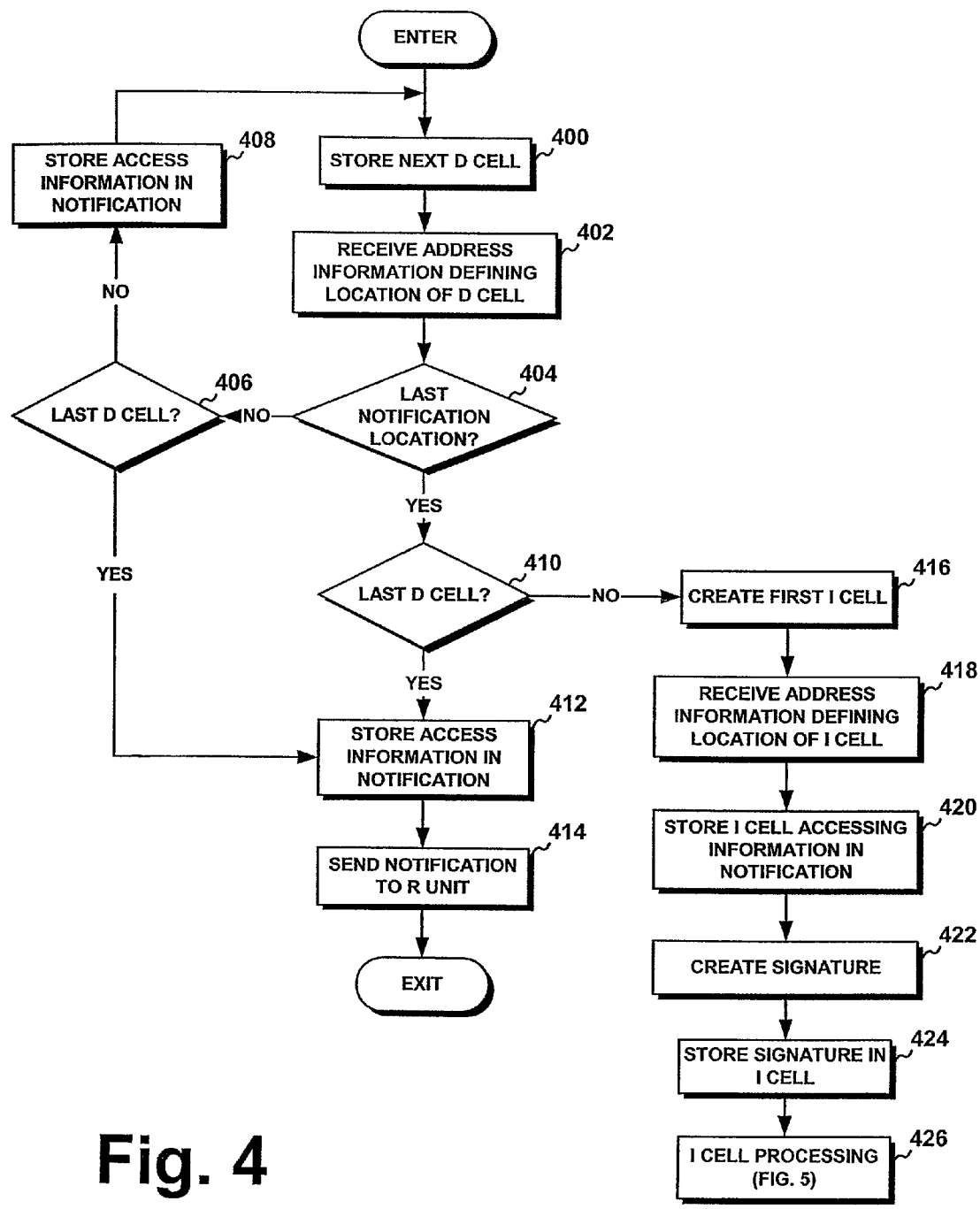
FIG. 4 is an exemplary flow chart illustrating acts that may be performed when storing D cells in an implementation consistent with the principles of the invention.

FIG. 4 is an exemplary flow chart illustrating acts that may be performed when storing D cells in an implementation consistent with the principles of the invention. Using first I/O logic 136 by way of example, first I/O logic 136 sends a D cell to Md 146 (act 400) to store the D cell. Md 146 returns address information to first I/O logic 136 that defines the location of the D cell in Md 146 (act 402). First I/O logic 136 stores the address of the first D cell as start access information 276 in notification 270. First I/O logic 136 may convert the addresses for the second and subsequent D cells into access information in the form of an address offset from the address of the previously-stored D cell.

First I/O logic 236 determines whether the next available address element location of address offsets 276 is the last address element location in notification 270 (act 404). If it's not, first I/O logic 236 determines whether the just stored D cell is the last D cell in the series of D cells (act 406). If it is not the last D cell, first I/O logic 236 stores: the access information in the notification (act 408), and proceeds with storing the next D cell (act 400). If it is the last D cell, this means that the notification can store all of the access information for reading the D cells of the packet, and it is not necessary for first I/O logic 136 to create I cells for overflow access information. First I/O logic 136 stores the access information for the D cell in the notification (act 412) and sends the notification to R unit 148 for processing (act 414).

If the next available address element location is the last location in the notification (act 404), I/O logic 136 determines whether the just stored D cell is the last D cell (act 410). If it is the last D cell, this means that the last location in notification 270 can be used to store the access information for the last D cell because the location will not be needed for storing an offset to an I cell. First I/O logic 136 stores the access information for the D cell in the last location of the notification (act 412) and sends the notification to R unit 148 for processing (act 414).

If the just stored D cell is not the last D cell (act 410), first I/O logic 136 creates the first I cell (act 416) and receives from Md 146 address information defining the location of the I cell (act 418). First I/O logic 136 may convert the address information into an address offset from the address of the last D cell in the notification, and store the offset in the last location of notification 270 (act 420). First I/O logic 136 creates a signature based on the notification (act 422), and stores the signature with the I cell (act 424). First I/O logic 136 then proceeds to I cell processing (act 426, FIG. 5).

Figure 5:
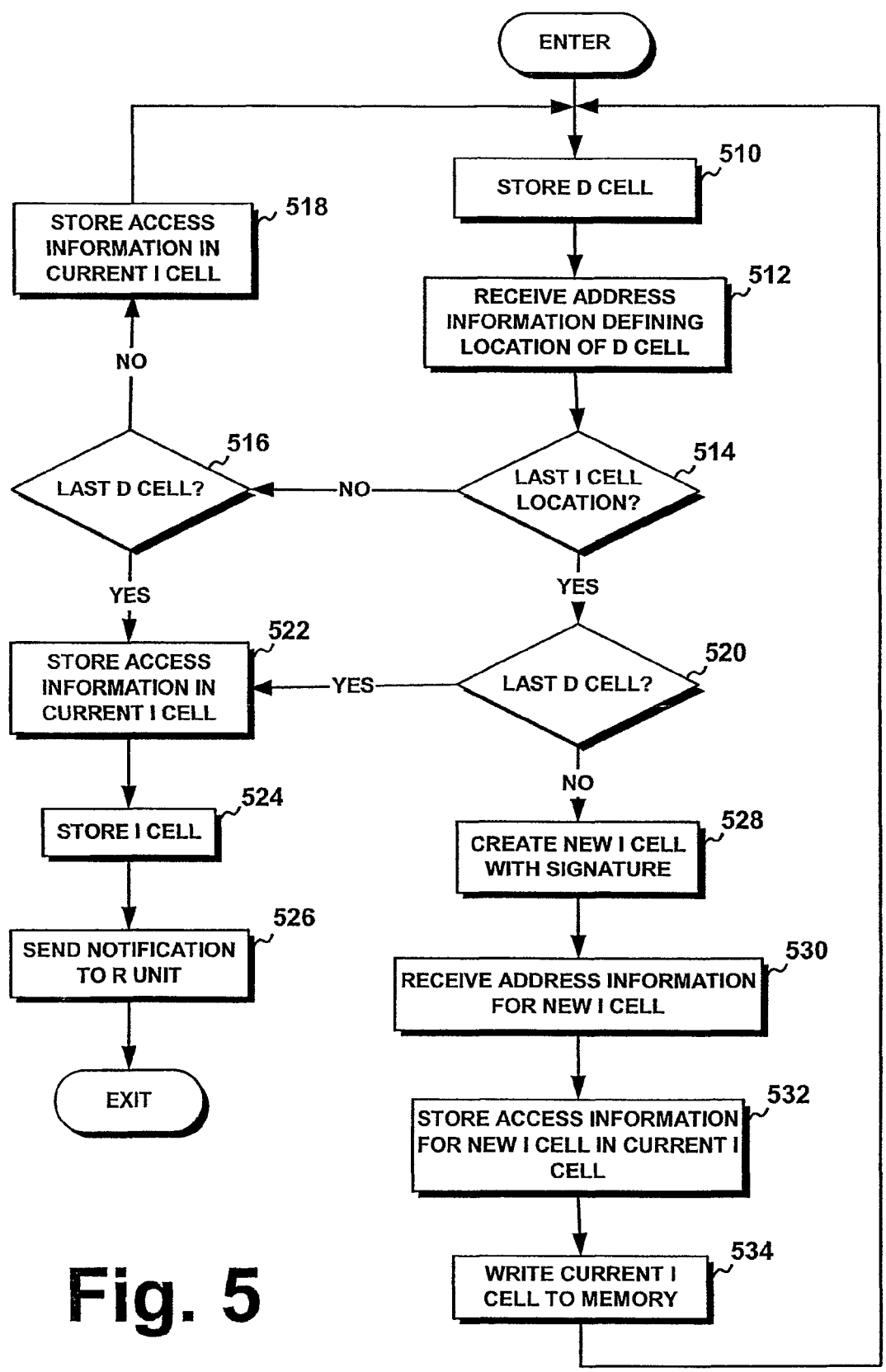
FIG. 5 is an exemplary flow chart illustrating acts that may be performed when storing indirect cells in an implementation consistent with the principles of the invention.

FIG. 5 is an exemplary flow chart illustrating acts that may be performed when storing I cells in an implementation consistent with the principles of the invention. First I/O logic 136 sends the next D cell (act 510) to Md 146, and receives back address information that defines the location of the D cell in Md 146 (act 512). First I/O logic 136 converts the address information into an address element Similar to notification processing of FIG. 4, first I/O logic 136 determines whether the next available address element location in the I cell is the last location (act 514). If its not, meaning that the I cell has more than one available address element location, first I/O logic 136 determines whether the just stored D cell is the last D cell (act 516). If it's not, first I/O logic 136 stores the access information for the D cell in the I cell (act 518). If it is the last D cell for the packet (act 516), first I/O logic 136 stores the access information for the D cell in the current I cell (act 522), and stores the I cell (act 524). First I/O logic 136 sends the completed notification to R unit 148 (act 526).

If first I/O logic 136 determines that the next available address element location is the last location in the current I cell (act 514), it then determines whether the just stored D cell is the last D cell (act 520). If it is the last D cell, first I/O logic 136 stores the access information in the last location of the I cell (act 522), and continues processing as described above.

If first I/O logic 136 determines that the just stored D cell is not the last D cell (act 520), meaning another I cell will be needed, first I/O logic 136 creates a new I cell and signature (act 528), receives address information from Md 146 for the new I cell (act 530), and stores access information for the new I cell in the last location of the current I cell (act 532). First I/O logic 534 then writes the current I cell to memory (act 534) and continues processing by storing the next D cell (act 510).

First I/O logic 136 continues storing D cells, and creating as many I cells as are necessary to store the address elements for the D cells of a packet. Each of the I cells include a pointer to the next I cell, creating a linked list of I cells, as illustrated in FIG. 3.

Similar processes to those illustrated in FIG. 4 and FIG. 5 may also be performed by second I/O logic 138 on the switch fabric side. When second I/O logic 138 receives D cells from the switch fabric, it proceeds to store the D cells in memory subsystem 140 in substantially the same manner as first I/O logic stores D cells, as described above with respect to FIG. 4 and FIG. 5.

Figure 6:
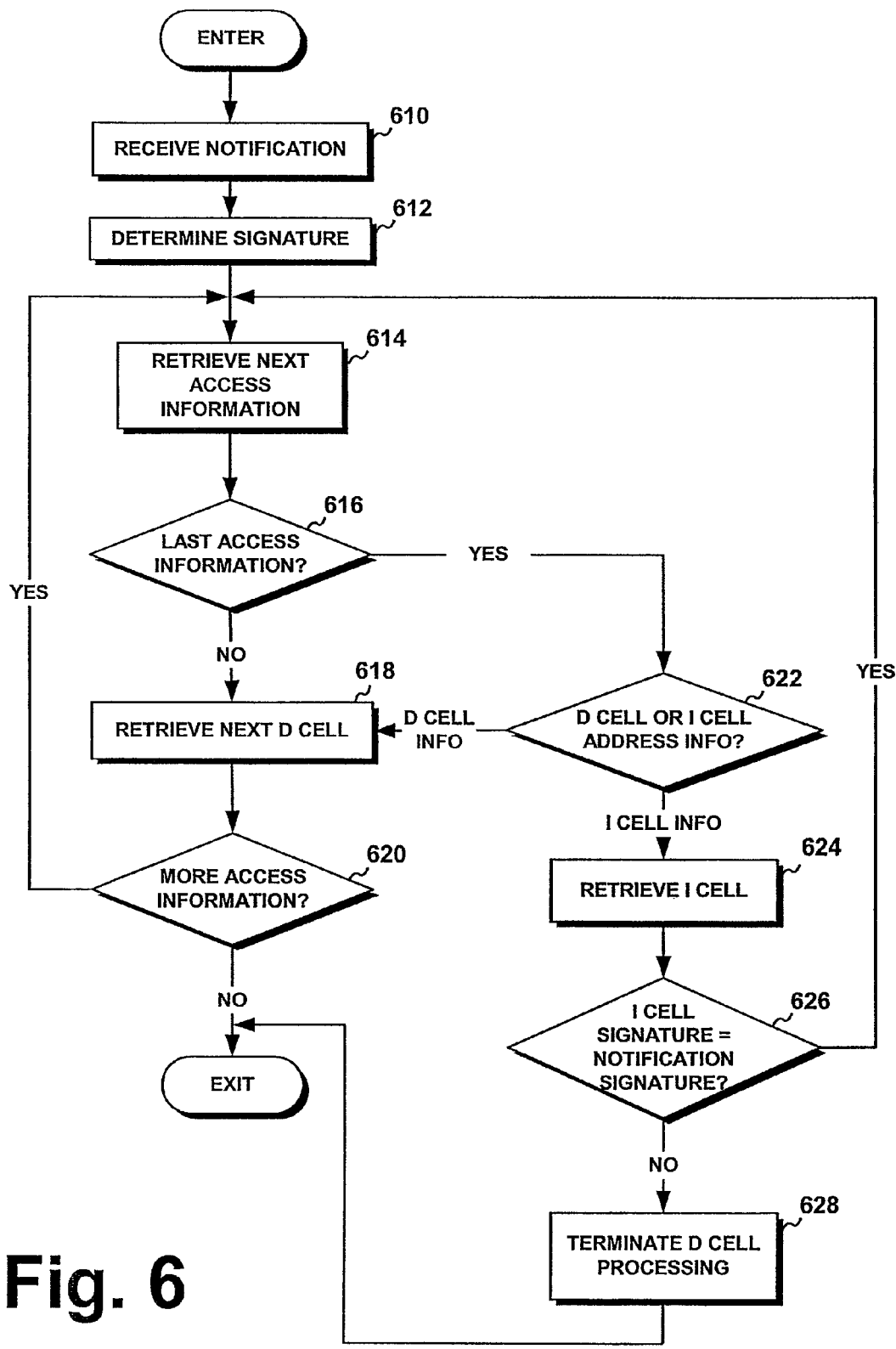
FIG. 6 is an exemplary flow chart illustrating acts that may be performed when reading data cells carrying portions of a packet in an implementation consistent with the principles of the invention.

FIG. 6 is an exemplary flow chart illustrating acts that may be performed when reading D cells from Md 146 in an implementation consistent with the principles of the invention. Assume Mq 142 has dequeued a notification and sent it to second I/O logic 138. Second I/O logic 138 receives the notification (act 610) and calculates the signature based on the notification (act 612). In one embodiment, the signature may be part of the notification and the second I/O logic 138 simply reads the signature from the notification.

Second I/O logic 138 starts working through the address elements stored in the notification to retrieve the D cells for the packet associated with the notification. Second I/O logic 138 starts by obtaining the next D cell address element stored in the notification (act 614). For the first D cell, second I/O logic 138 uses start access information 276 from notification 270.

Second I/O logic 138 determines whether the access information is stored in the last access information location in the notification (act 616). If it's not, the access information is D cell access information, and second I/O logic 138 uses the access information to create a D cell address and retrieve the D cell at the address from Md 146 (act 618). If there is more access information in the notification (act 620), then second I/O logic 138 continues processing by retrieving the next access information in the notification (act 614). This process continues until second I/O logic 138 determines that the last location in the notification has been reached (act 616).

If the last location in the notification has been reached, second I/O logic 138 determines whether the last location stores D cell access information, or a pointer to an I cell. If the last location is D cell access information, second I/O logic 138 uses the information to retrieve the next D cell (act 618). Since this is the last access information in the notification, there is no more access information (act 620), and the process exits.

If second I/O logic 138 determines that the last location stores I cell access information (act 622), the I cell is retrieved using the I cell access information (act 624). The signature stored with the I cell is checked against the signature generated from the notification (act 626). If the signatures match, meaning that the I cell is valid, second I/O logic 138 continues processing by retrieving the next access information from the I cell (act 614). The process continues as described above until either all access information in the I cell is exhausted or another I cell is accessed.

If second I/O logic 138 determines that the I cell signature does not match the notification signature (act 626), D cell processing is terminated (act 628). The signatures may not match for several reasons. For example, it is possible, that the last I cell may not be stored in Md 146 by the time the notification is processed by R unit 148 and sent to second I/O logic 138. The notification may be processed by R unit 148 and returned to second 110 logic 138 before all the D cells, and thus all the I cells, were finished being stored. It is also possible that one or more I cells for a packet were corrupted when they were written, stored, or read.

Operations similar to those illustrated and described with respect to FIG. 6 may also be performed by first I/O logic 136 when reading out D cells from Md 146 based on a notification from Mq 142. Storing a signature with each I cell allows the first and second I/O logic 136 and 138 to verify the validity of each I cell.

The foregoing description of preferred embodiments consistent with the principles of the invention provides illustration and description, but is not intended to be exhaustive or to limit the invention to the precise form disclosed. Modifications and variations are possible in light of the above teachings or may be acquired from practice of the invention.

The scope of the invention is defined by the claims and their equivalents.

What is claimed is:

1. In a device, a method comprising:
   generating, for a received data unit, a notification including address elements;
   generating, by an input/output (I/O) unit, of the device, a first signature based on a first portion of the notification;
   writing, based on one or more of the address elements, at least one portion of the received data unit and the first signature to a memory;
   generating, by the I/O unit, a second signature based on a second portion, of the notification, including the address elements;
   reading the at least one portion of the received data unit and the first signature from the memory, based on a third portion of the notification;
   comparing, by the I/O unit, the first signature and the second signature; and
   verifying, by the I/O unit and based on a result of comparing the first signature and the second signature, a validity of the at least one portion of the received data unit read from the memory.

2. The method of claim 1, further comprising:
   processing the received data unit; and
   modifying a fourth portion, of the notification, to include results of the processing, where the fourth portion is different from the second portion.

3. The method of claim 1, where verifying the validity of the at least one portion comprises:
   checking whether the first signature and the second signature match, where the at least one portion of the received data unit is valid when the first signature and the second signature match.

4. The method of claim 3, where a determination that the first signature and the second signature do not match is indicative of at least one of:
the writing of the at least one portion of the received data unit has not been completed, or
corruption of the at least one portion of the received data unit has occurred.

5. The method of claim 1, further comprising:
determining, based on verifying the validity of the at least one portion, that the at least one portion of the received data unit is invalid due to corruption from at least one of:
writing the at least one portion of the received data unit to the memory,
storing the at least one portion of the received data unit in the memory, or
reading the at least one portion of the received data unit from the memory.

6. The method of claim 1, where the at least one ether portion comprises a plurality of other portions of the received data unit, where the plurality of other portions are associated as a linked list.

7. The method of claim 6, further comprising:
processing each of the plurality of other portions of the received data unit upon the verification of the validity of the plurality of other portions of the received data unit; and
terminating the processing of the plurality of other portions of the received data unit when at least one of the plurality of other portions fails the verification.

8. The method of claim 1, further comprising:
processing the at least one portion of the received data unit in parallel with writing of the at least one portion of the received data unit to the memory.

9. The method of claim 1, where the generating the first signature comprises:
performing a mathematical algorithm on the first portion of the notification.

10. The method of claim 1, where the mathematical algorithm is a cyclic redundancy check.

11. A network device comprising:
a first unit to:
generate a first signature based on a portion of a received packet, and
generate, for the received packet, a notification including address elements;
a memory, to which at least one other portion, of the received packet with the first signature, is written based on the address elements; and
a second unit to:
generate a second signature, based on a particular portion, of the notification, including the address elements, and
read, responsive to receiving the notification, the at least one other portion of the received packet and the first signature from the memory, where the second unit is further to verify, based on a result of a comparison of the first signature and the second signature, a validity of the at least one other portion of the received packet read from the memory.

12. The network device of claim 11, further comprising:
a processor to perform routing-related processing on the received packet; and
a third unit to modify at least another portion of the notification, other than the particular portion, to include results of the processing.

13. The network device of claim 12, where the at least one other portion comprises a plurality of other portions of the received packet, where the plurality of other portions are associated as a linked list.

14. The network device of claim 13, where the third unit is further to:
process each of the plurality of other portions of the received packet upon the verification of the validity of the plurality of other portions of the received packet, and
terminate the processing of the plurality of other portions of the received packet when at least one of the plurality of other portions fails the verification.

15. The network device of claim 12, where, when generating the first signature, the third unit is further to:
a cyclic redundancy check.

16. In a device, a method comprising:
receiving a packet at the device;
extracting, by the device, first data from contents of the received packet to form second data, where the second data is formed from remaining contents of the received packet;
creating, by the device and based on at least a portion of the first data, a first signature, to identify the second data as being associated with the received packet and a second signature to be included with the first data;
writing, based on address elements associated with the received packet, the second data and the first signature to a memory of the device;
performing, by the device, packet processing on the first data;
comparing, by the device, the second signature to the first signature upon reading the second data and the first signature from the memory and reading the second signature from the first data; and
verifying a validity of the second data, read from the memory, based on a result of the comparing.

17. The method of claim 16, where the writing and the performing the packet processing occur in parallel.

18. The method of claim 16, where, when the writing is not completed before reading the second data and the first signature from the memory, a result of the comparing indicates that the first signature does not match the second signature.

19. The method of claim 16, where the second data points to the first data in the memory.

* * * * *

UNITED STATES PATENT AND TRADEMARK OFFICE
CERTIFICATE OF CORRECTION

PATENT NO.        : 8,089,861 B1
APPLICATION NO.   : 12/143064
DATED             : January 3, 2012
INVENTOR(S)       : Rami Rahim et al.

It is certified that error appears in the above-identified patent and that said Letters Patent is hereby corrected as shown below:

Column 9, claim 6, line 18, after "at least one", delete "ether".

Column 10, claim 15, line 25, insert --perform-- before "a cyclic redundancy check".

Column 10, claim 16, line 34, after "packet", insert a --,--.

Signed and Sealed this
Seventh Day of February, 2012

David J. Kappos
*Director of the United States Patent and Trademark Office*